(12) United States Patent
Niergarth et al.

(10) Patent No.: US 11,725,584 B2
(45) Date of Patent: Aug. 15, 2023

(54) HEAT ENGINE WITH HEAT EXCHANGER

(71) Applicant: General Electric Company, Schenectady, NY (US)

(72) Inventors: Daniel Alan Niergarth, Cincinnati, OH (US); Brandon Wayne Miller, Liberty Township, OH (US); Jeffrey Douglas Rambo, Mason, OH (US); Matthew Robert Cerny, West Chester, OH (US)

(73) Assignee: General Electric Company, Schenectady, NY (US)

( * ) Notice: Subject to any disclaimer, the term of this patent is extended or adjusted under 35 U.S.C. 154(b) by 1035 days.

(21) Appl. No.: 15/873,605

(22) Filed: Jan. 17, 2018

(65) Prior Publication Data

US 2019/0218971 A1    Jul. 18, 2019

(51) Int. Cl.
*F02C 7/14* (2006.01)
*F02C 9/18* (2006.01)
*F02C 7/18* (2006.01)

(52) U.S. Cl.
CPC ............... *F02C 7/14* (2013.01); *F02C 7/185* (2013.01); *F02C 9/18* (2013.01);
(Continued)

(58) Field of Classification Search
CPC .... F02C 7/12; F02C 7/14; F02C 7/185; F02C 6/08; F02C 9/18; F02C 9/32; F02C 9/36;
(Continued)

(56) References Cited

U.S. PATENT DOCUMENTS 3,779,007 A * 12/1973 Lavash .................... F02C 7/14
                                                                60/39.83
4,254,618 A    3/1981 Elovic
(Continued)

FOREIGN PATENT DOCUMENTS

CN    1603596 A    4/2005
CN    101576024 A    11/2009
(Continued)

OTHER PUBLICATIONS

European Search Report Corresponding to Application No. EP18215697 dated May 21, 2019.
(Continued)

*Primary Examiner* — Todd E Manahan
*Assistant Examiner* — Thuyhang N Nguyen
(74) *Attorney, Agent, or Firm* — Dority & Manning, P.A.

(57) ABSTRACT

A heat engine comprising a compressor providing a flow of compressed air from a core flowpath of the heat engine; a cooled cooling air (CCA) heat exchanger system to which the flow of compressed air is provided from the compressor; a coolant supply system providing a flow of coolant to the CCA heat exchanger in thermal communication with the flow of compressed air at the CCA heat exchanger, in which the coolant supply system and CCA heat exchanger together define a CCA circuit through which the compressed air flows in thermal communication with the coolant; and a hot section disposed downstream of the compressor section along the core flowpath through which combustion gases flow, in which the hot section defines a secondary flowpath through which the flow of compressed air from the CCA heat exchanger is provided.

14 Claims, 9 Drawing Sheets

(52) U.S. Cl.
CPC .. *F05D 2260/213* (2013.01); *F05D 2270/301* (2013.01); *F05D 2270/303* (2013.01)

(58) Field of Classification Search
CPC . F02C 7/224; F05D 2260/20; F05D 2260/213
See application file for complete search history.

(56) References Cited

U.S. PATENT DOCUMENTS

| | | | |
|---|---|---|---|
| 4,546,605 | A | 10/1985 | Mortimer et al. |
| 5,305,616 | A * | 4/1994 | Coffinberry ............... F02C 7/18 62/402 |
| 6,106,229 | A | 8/2000 | Nikkanen et al. |
| 6,253,554 | B1 * | 7/2001 | Kobayashi ............. F02C 7/224 60/736 |
| 7,836,680 | B2 | 11/2010 | Schwarz et al. |
| 7,926,289 | B2 | 4/2011 | Lee et al. |
| 8,747,055 | B2 | 6/2014 | McCune et al. |
| 9,200,855 | B2 | 12/2015 | Kington et al. |
| 9,410,482 | B2 | 8/2016 | Krautheim et al. |
| 9,458,764 | B2 | 10/2016 | Alecu et al. |
| 10,100,736 | B2 | 10/2018 | Niergarth et al. |
| 10,352,243 | B2 * | 7/2019 | Mizukami ............... F02C 7/141 |
| 10,578,028 | B2 | 3/2020 | Becker, Jr. |
| 2009/0229812 | A1 | 9/2009 | Pineo et al. |
| 2010/0139288 | A1 | 6/2010 | Rago |
| 2010/0192593 | A1 * | 8/2010 | Brown ...................... F02C 7/14 701/100 |
| 2011/0150634 | A1 | 6/2011 | Bajusz et al. |
| 2011/0162387 | A1 | 7/2011 | Chir et al. |
| 2012/0174583 | A1 * | 7/2012 | Lehar ...................... F01K 13/00 165/104.11 |
| 2013/0104564 | A1 * | 5/2013 | Arar ......................... F02C 9/18 60/785 |
| 2013/0186100 | A1 | 7/2013 | Rhoden et al. |
| 2013/0247587 | A1 | 9/2013 | Lo |
| 2014/0230444 | A1 * | 8/2014 | Hao ...................... F01D 25/305 60/39.5 |
| 2015/0114611 | A1 * | 4/2015 | Morris .................... B23P 15/26 165/166 |
| 2016/0108814 | A1 | 4/2016 | Schmitz |
| 2016/0326963 | A1 | 11/2016 | Yamazaki |
| 2016/0341126 | A1 | 11/2016 | Kupratis et al. |
| 2017/0030266 | A1 | 2/2017 | Cerny et al. |
| 2017/0044984 | A1 | 2/2017 | Pesyna et al. |
| 2017/0114721 | A1 | 4/2017 | Miller et al. |
| 2017/0159563 | A1 | 6/2017 | Sennoun |
| 2017/0159566 | A1 | 6/2017 | Sennoun et al. |
| 2017/0167382 | A1 | 6/2017 | Miller et al. |
| 2017/0184027 | A1 | 6/2017 | Moniz et al. |
| 2017/0260905 | A1 | 9/2017 | Schmitz |
| 2019/0218971 | A1 | 7/2019 | Niergarth et al. |

FOREIGN PATENT DOCUMENTS

| | | |
|---|---|---|
| CN | 203441604 U | 2/2014 |
| CN | 105579688 A | 5/2016 |
| CN | 107035528 A | 8/2017 |
| EP | 3514349 A1 | 7/2019 |
| GB | 2034822 A | 6/1980 |
| JP | H07208200 A | 8/1995 |
| WO | WO2015/105552 A1 | 7/2015 |
| WO | WO2015105552 A1 | 7/2015 |

OTHER PUBLICATIONS

PCT International Search Report Corresponding to PCT/US2014/059220 dated Jan. 26, 2015.
Chinese Office Action and Search Report Corresponding to Application No. 201910043886 dated Feb. 3, 2021.

* cited by examiner

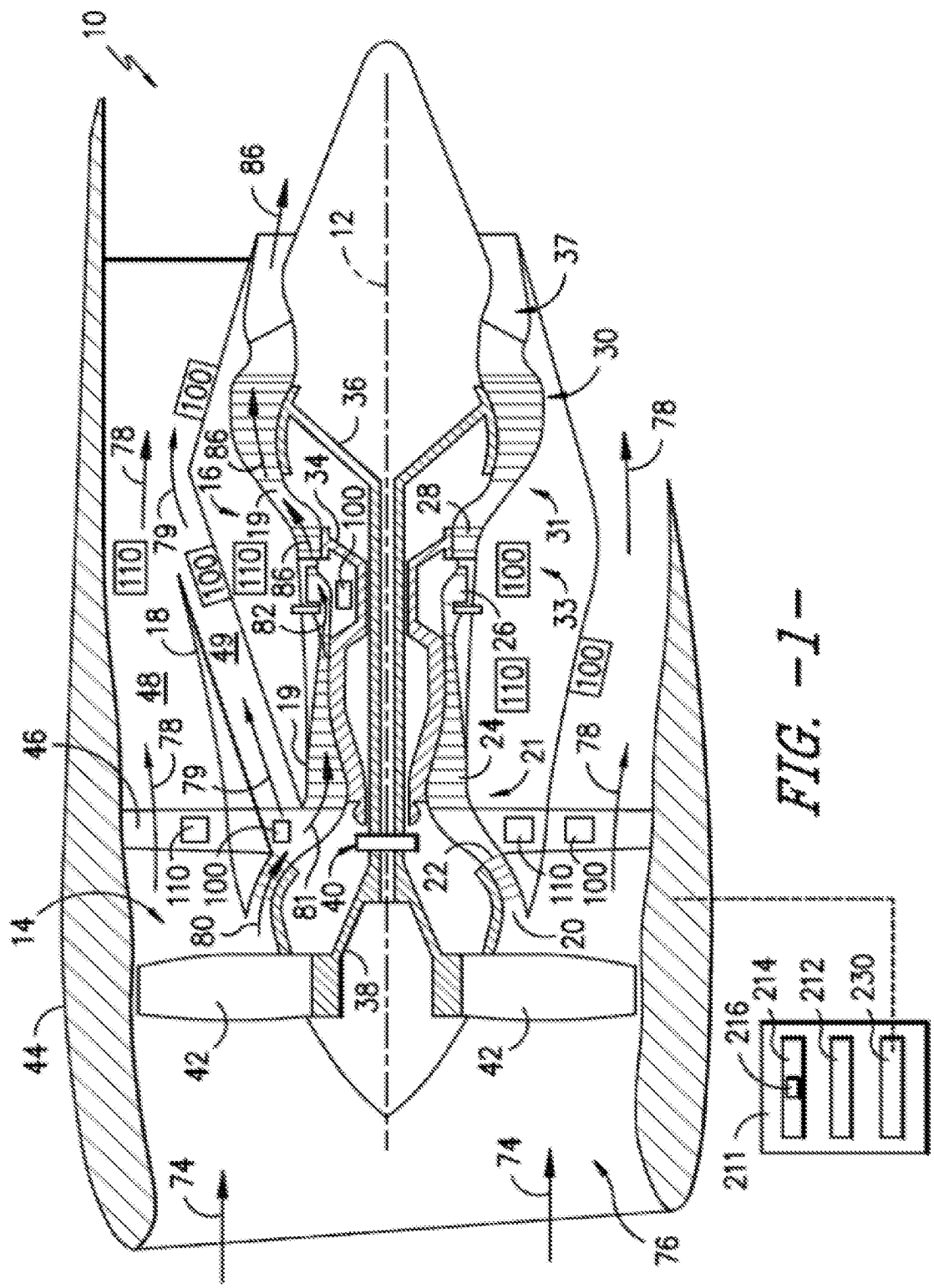
FIG. -1-

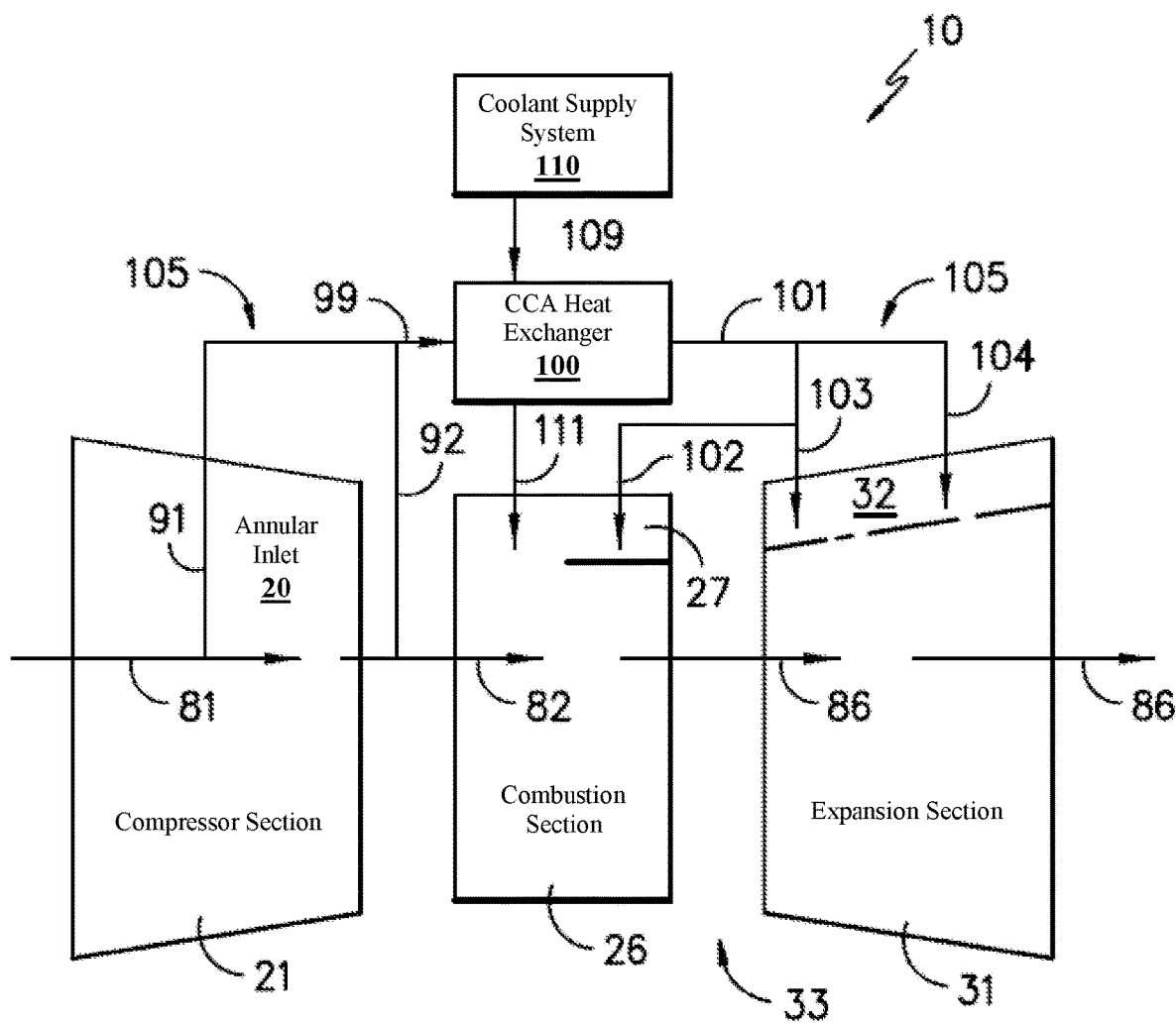
FIG. -2-

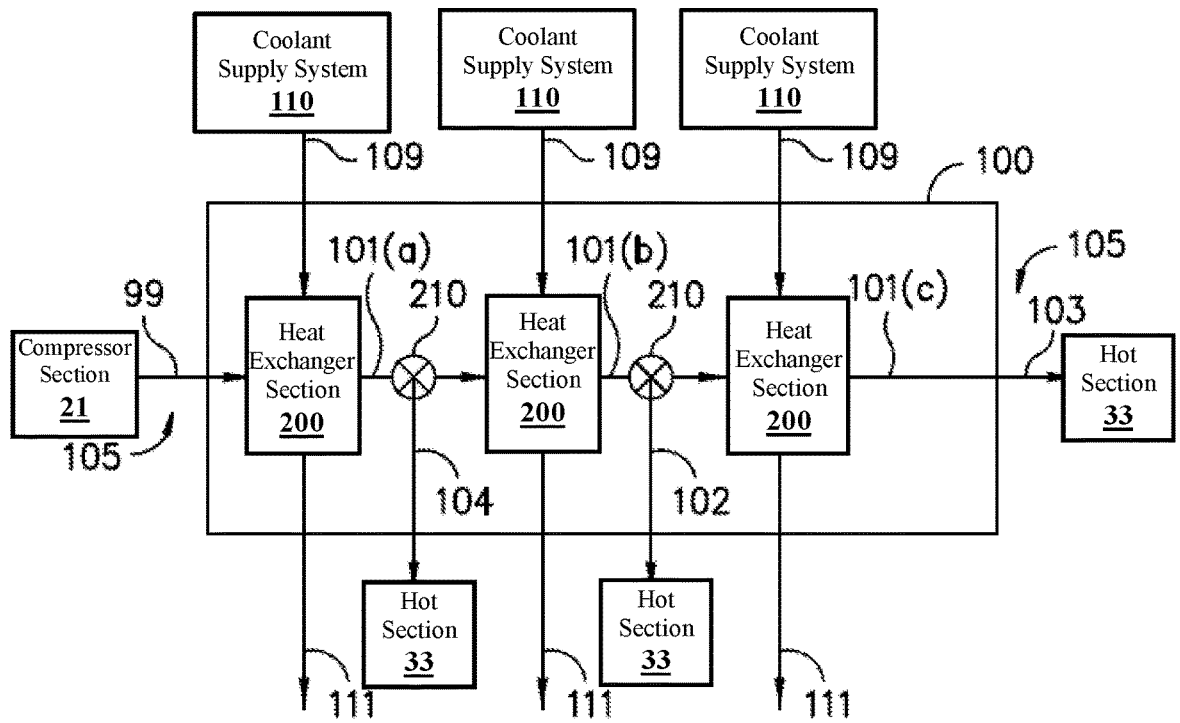
FIG. -3-
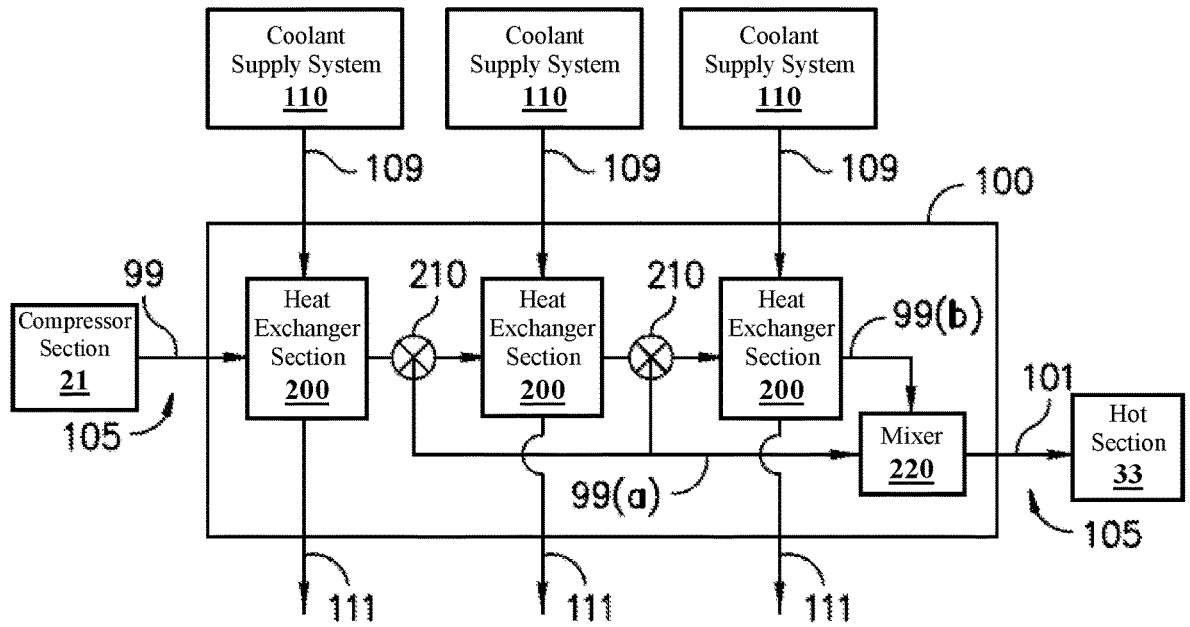
FIG. -4-

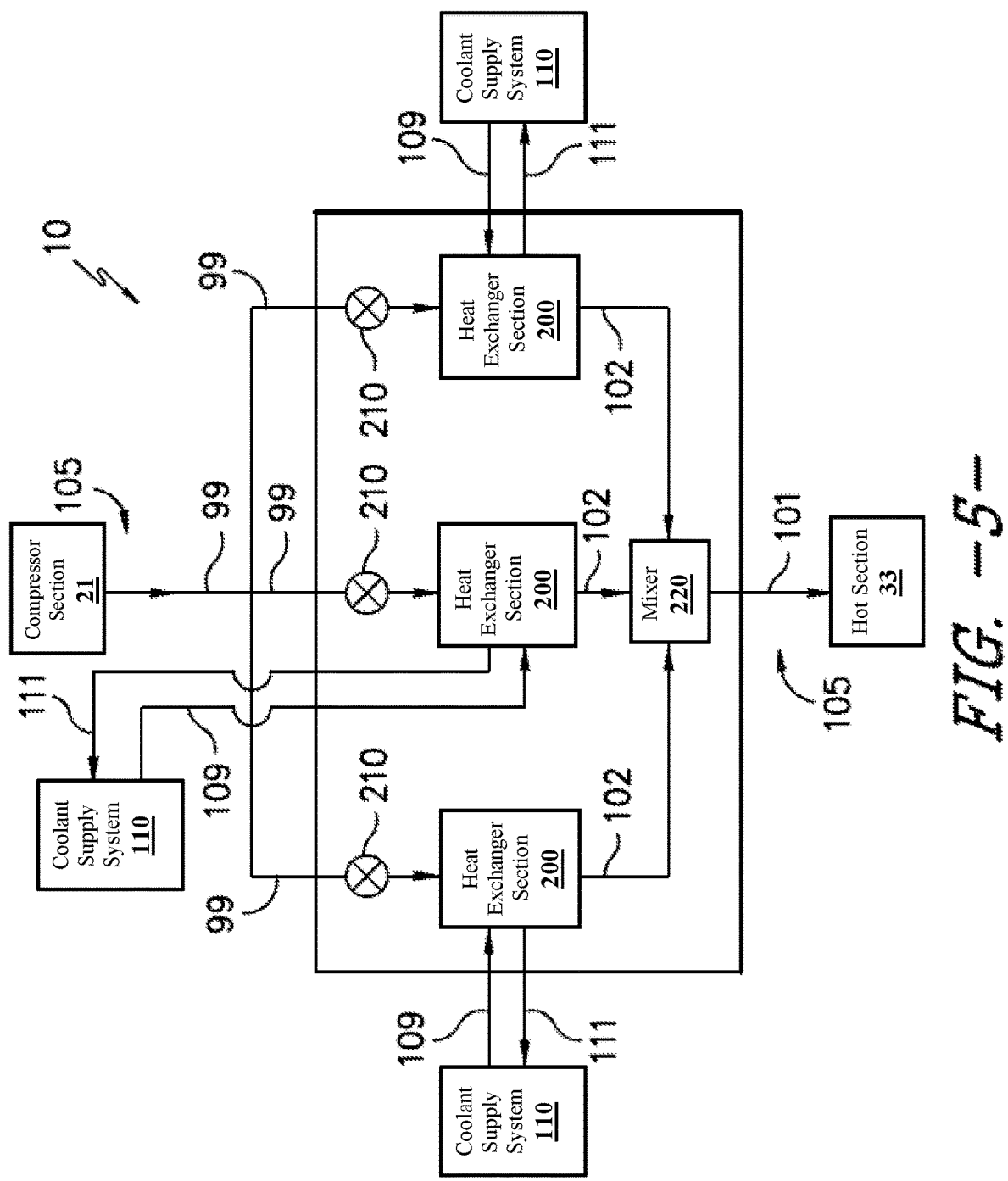
FIG. -5-

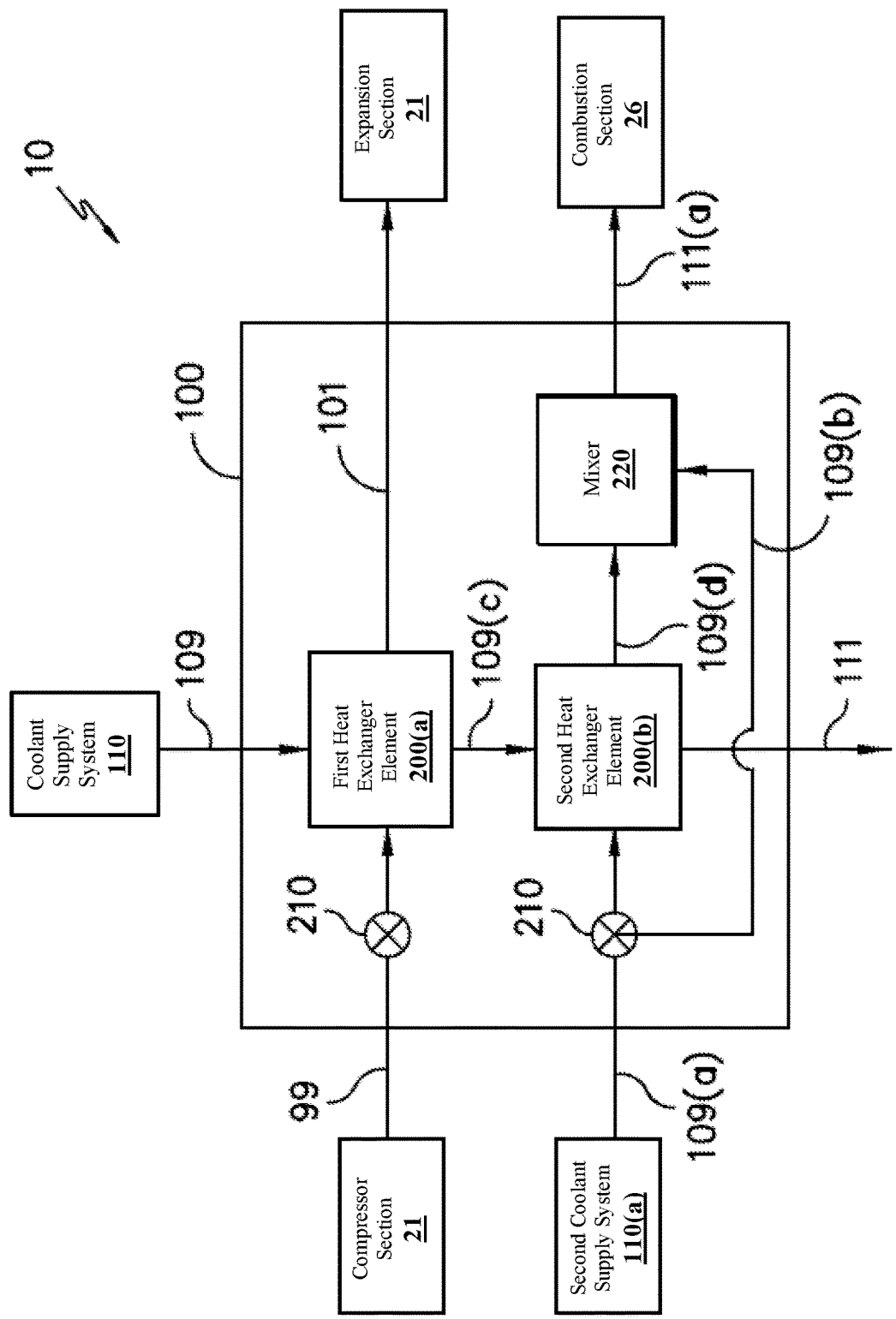

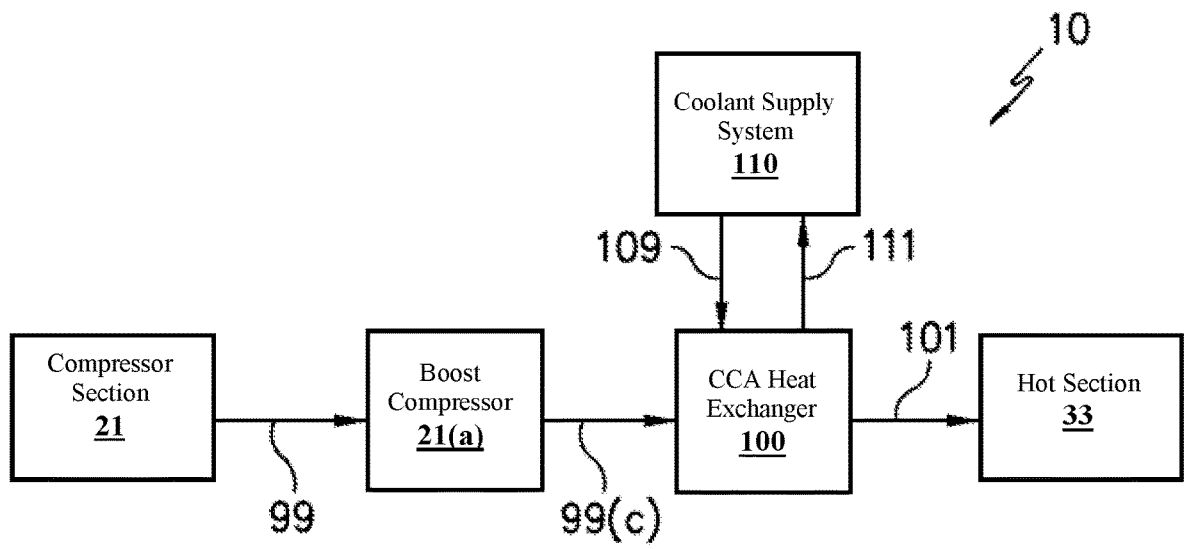
FIG. −7−
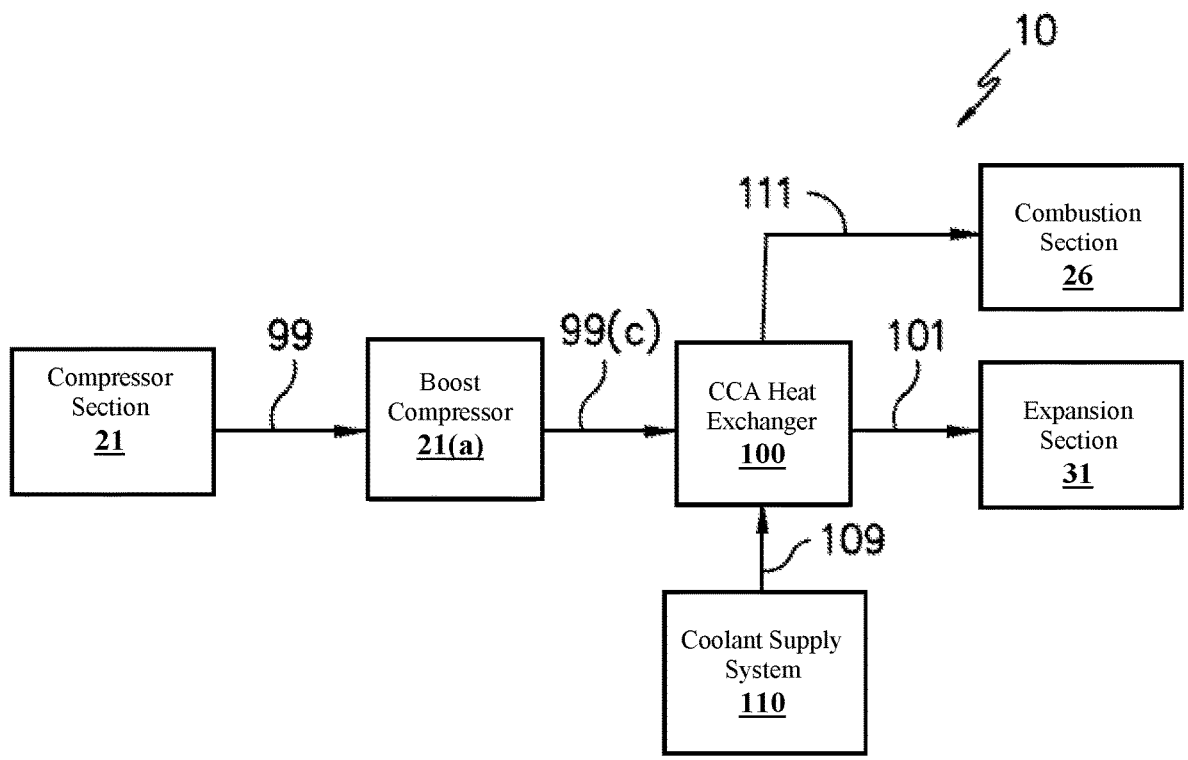
FIG. −8−

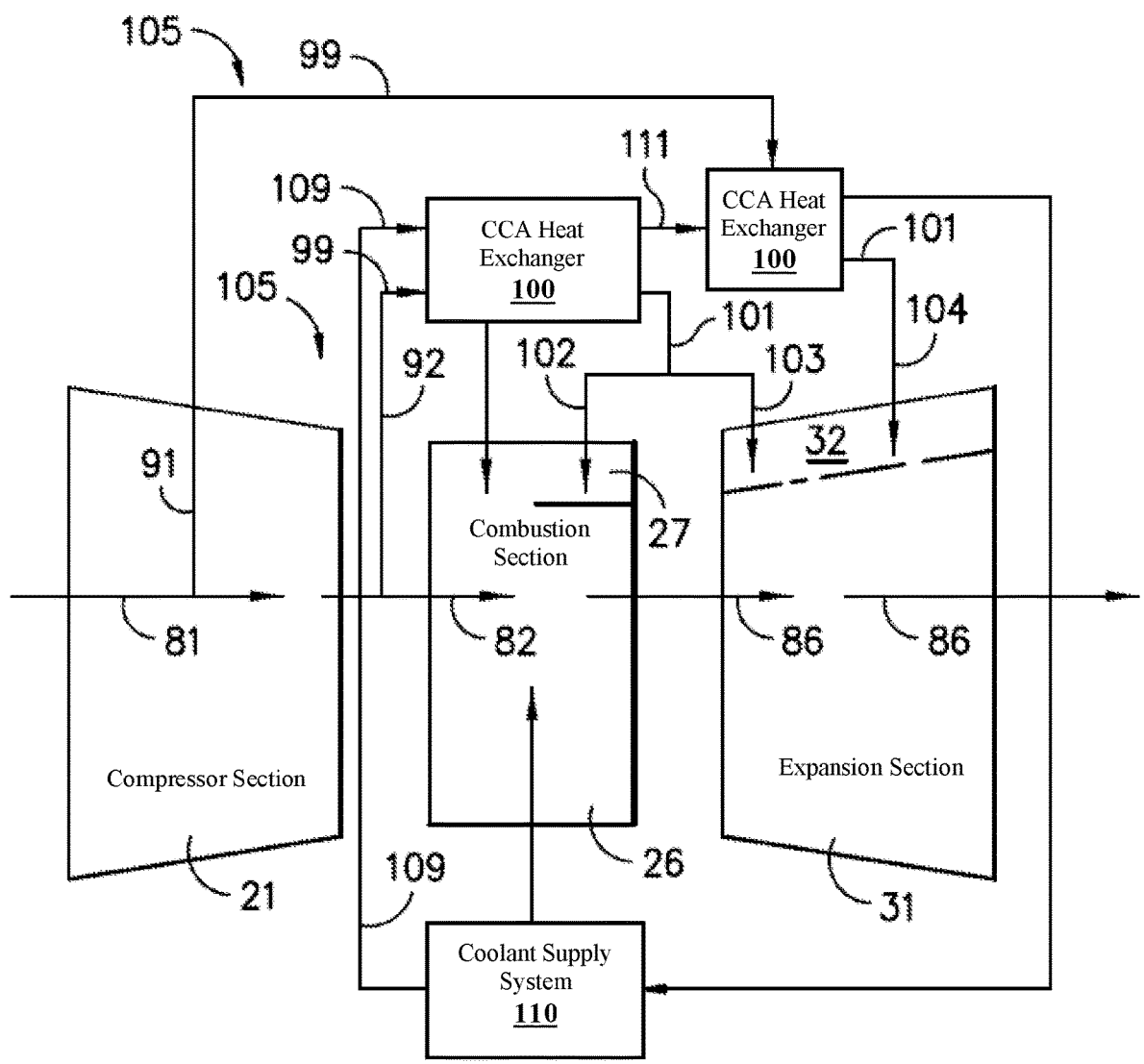
FIG. -9-

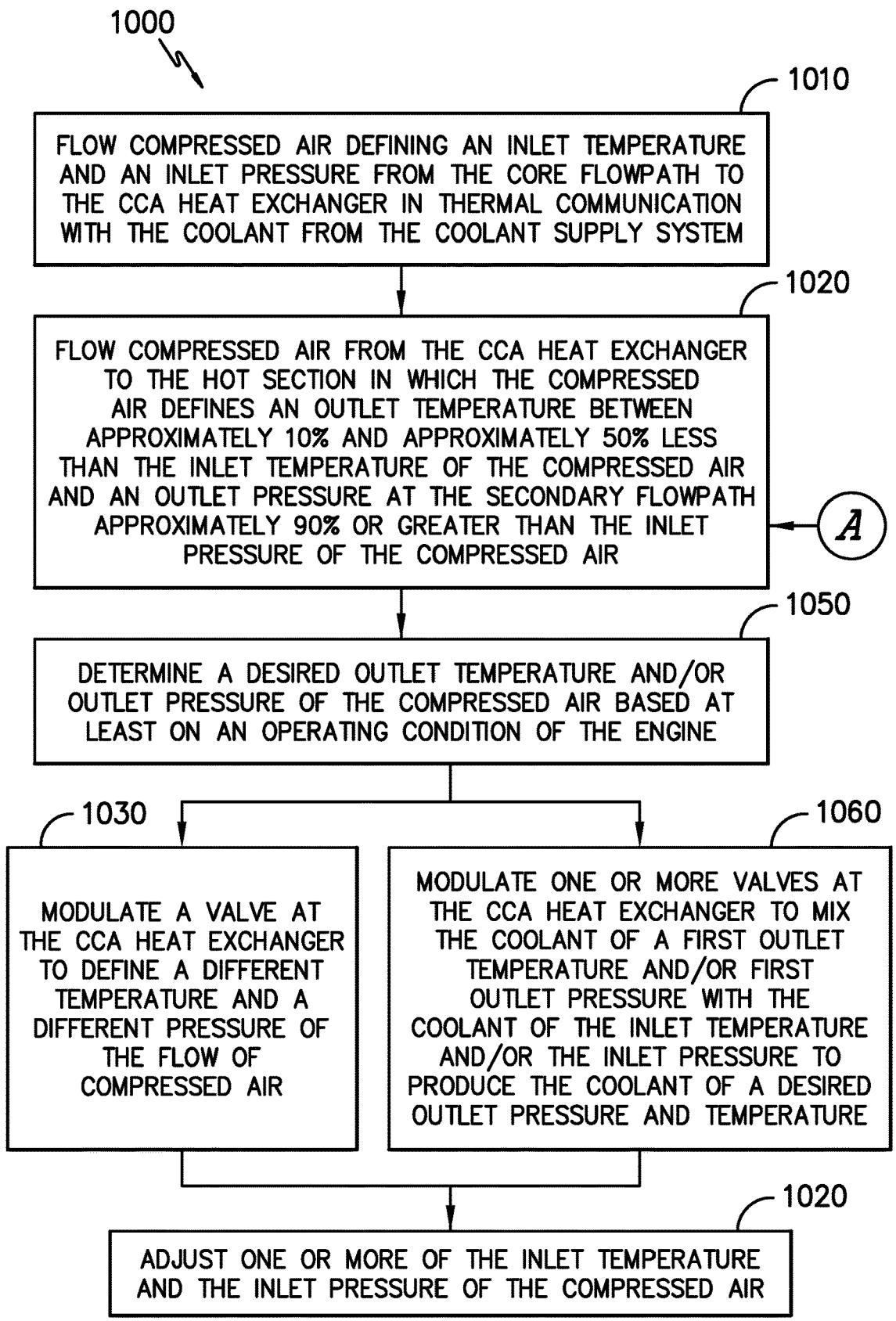
FIG. -10-

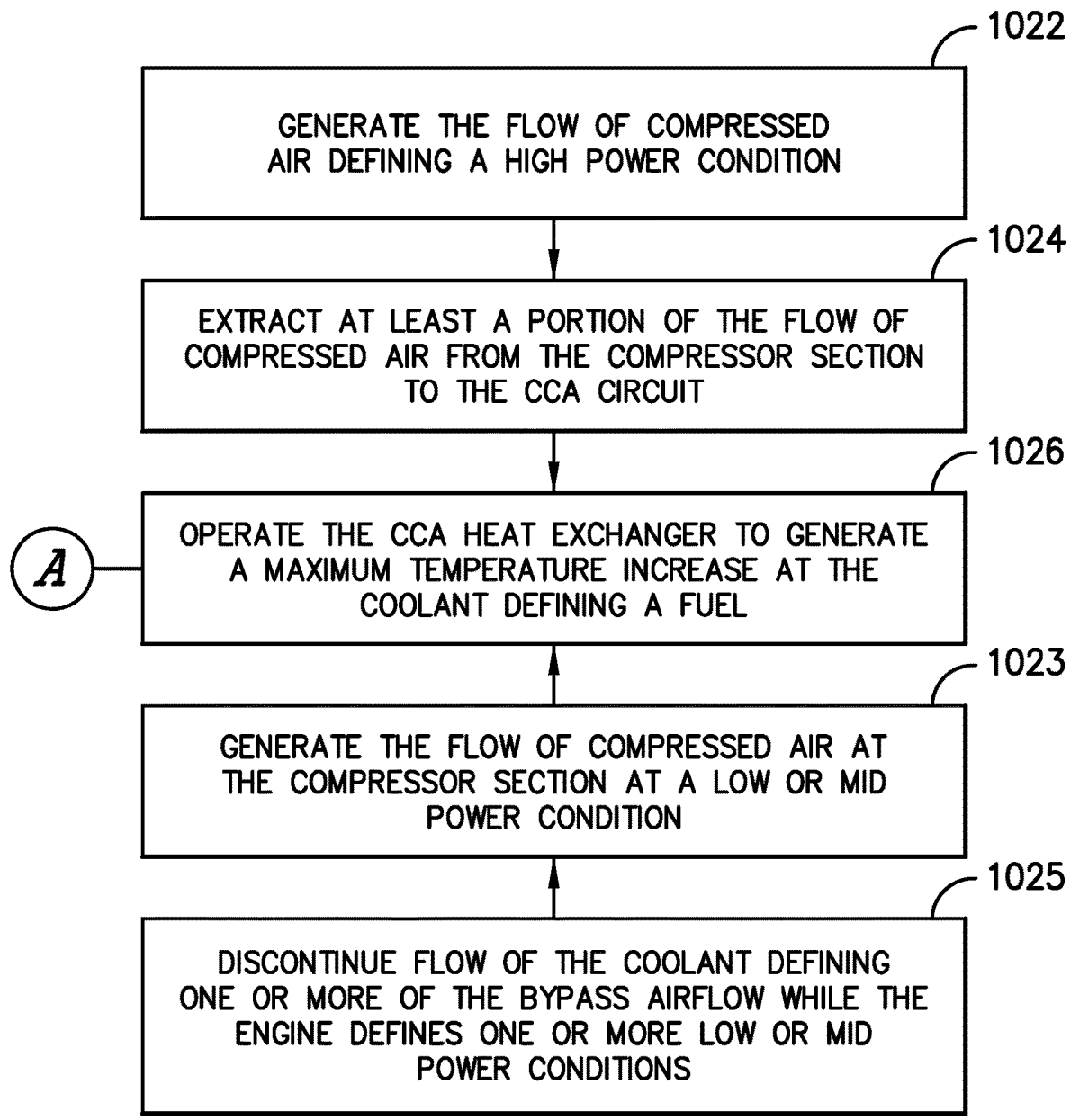
FIG. -11-

HEAT ENGINE WITH HEAT EXCHANGER

FIELD

The present subject matter relates generally to heat engines and turbo machines including heat exchanger systems.

BACKGROUND

Heat engines, such as gas and steam turbine engines, may include heat exchangers utilized for heat transfer of fluids throughout the engine. The cooled fluids are used for thermal attenuation at various structures at the engine, such as to improve component structural life, or to improve or alter the aerodynamic or thermodynamic cycle of the engine.

However, heat exchanger systems within heat engines are generally limited in performance such as to limit how much a fluid may be cooled. As such, the cooling fluid is limited in its ability to provide thermal attenuation to improve component structural life. Additionally, known heat exchangers are generally limited in how much of a cooled fluid may be provided to one or more components or systems due to a loss in pressure via the heat exchanger. As such, a sufficiently cool fluid may lack the pressure necessary to overcome higher pressure sections of the heat engine, such as at a combustion section or expansion section. This limitation becomes more problematic as heat engines, such as turbomachines, are generally increasing, or seeking to increase, combustion gas temperatures or pressures at combustion sections and expansion sections, thereby exposing structures therewithin and in thermal proximity to higher temperatures that may reduce component or system life.

As such, there is a need for a heat engine and heat exchanger that provides improved heat transfer to a cooled fluid for thermal attenuation at various components or systems of the heat engine.

BRIEF DESCRIPTION

Aspects and advantages of the invention will be set forth in part in the following description, or may be obvious from the description, or may be learned through practice of the invention.

An aspect of the present disclosure is directed to a heat engine including a compressor providing a flow of compressed air from a core flowpath of the heat engine; a cooled cooling air (CCA) heat exchanger system to which the flow of compressed air is provided from the compressor; a coolant supply system providing a flow of coolant to the CCA heat exchanger in thermal communication with the flow of compressed air at the CCA heat exchanger, in which the coolant supply system and CCA heat exchanger together define a CCA circuit through which the compressed air flows in thermal communication with the coolant; and a hot section disposed downstream of the compressor section along the core flowpath through which combustion gases flow, in which the hot section defines a secondary flowpath through which the flow of compressed air from the CCA heat exchanger is provided.

In one embodiment, the flow of compressed air defines an inlet temperature and an inlet pressure from the core flowpath at the compressor section. The flow of compressed air defines an outlet temperature at the secondary flowpath at the hot section between approximately 2% and approximately 50% less than the inlet temperature. The flow of compressed air defines an outlet pressure at the secondary flowpath greater than approximately 90% of the inlet pressure of the flow of compressed air at the core flowpath at the compressor section.

In various embodiments, the CCA heat exchanger includes one or more heat exchanger elements through which the coolant flows in thermal communication with the compressed air from the compressor section. In one embodiment, the CCA heat exchanger further includes one or more valves disposed between a plurality of heat exchanger elements. The valve selectively bypasses at least a portion of the flow of compressed air from one or more heat exchanger elements. In another embodiment, the CCA heat exchanger further recombines one or more flows of compressed air from the plurality of heat exchanger elements to produce the flow of compressed air defining an outlet temperature and/or outlet pressure. In still various embodiments, the plurality of heat exchanger elements is disposed in parallel arrangement. In still yet various embodiments, the plurality of heat exchanger elements is disposed in serial flow arrangement.

In one embodiment, the coolant supply system defines one or more of a fuel system, a lubricant system, a hydraulic fluid system, a refrigerant system, a bypass airflow passage, or a compressor bleed.

In another embodiment, the coolant is a liquid or gaseous fuel, refrigerant, supercritical gas, liquid metal, inert gas, bypass airflow, compressed air or combinations thereof.

Another aspect of the present disclosure is directed to a heat engine including a core engine comprising a compressor section configured to generate a flow of compressed air and a hot section defining a secondary flowpath; a cooled cooling air (CCA) heat exchanger system disposed in serial flow arrangement between the compressor section and the hot section, in which the compressor section, the CCA heat exchanger system, and the secondary flowpath of the hot section together define a CCA circuit; a coolant supply system configured to provide a flow of coolant to the CCA heat exchanger system; and a controller comprising a processor and memory configured to store instructions that when executed by the processor causes the processor to perform operations. The operations include flowing compressed air defining an inlet temperature and an inlet pressure from the compressor section through the CCA circuit in thermal communication with the coolant from the coolant supply system; and flowing from the CCA heat exchanger to the secondary flowpath the compressed air defining at the hot section an outlet temperature between approximately 2% and approximately 50% less than the inlet temperature, and further defining at the secondary flowpath an outlet pressure approximately 90% or greater than the inlet pressure.

In various embodiments, the operations further include generating the flow of compressed air at the compressor section at a high power condition of the heat engine; and extracting at least a portion of the flow of compressed air from the compressor section to the CCA circuit. In one embodiment, the operations further include operating the CCA heat exchanger to generate a maximum temperature increase at the coolant defining one or more of bypass air, refrigerant, supercritical fluid, liquid metal, fuel, inert gas, or compressed air.

In still various embodiments, the operations further include generating the flow of compressed air at the compressor section at a low or mid power condition of the heat engine; and extracting at least a portion of the flow of compressed air from the compressor section to the CCA circuit. In one embodiment, the operations further include discontinuing flow of the coolant defining one or more of a bypass airflow when the heat engine defines a low or mid power condition.

In still yet various embodiments, the operations further include modulating a valve at the CCA heat exchanger to define a different temperature and a different pressure of the flow of compressed air. In one embodiment, the operations further include adjusting one or more of the inlet temperature and the inlet pressure of the compressed air via adjusting from where in the compressor section the compressed air from the core flowpath is provided to the CCA heat exchanger. In another embodiment, adjusting one or more of the inlet temperature and the inlet pressure of the compressed air via mixing flows of the compressed air from the core flowpath.

In one embodiment, the operations further include determining a desired outlet temperature, outlet pressure, or both, of the compressed air based at least on an operating condition of the heat engine.

In another embodiment, the operations further include modulating one or more valves at the CCA heat exchanger to mix the coolant of a first outlet temperature and/or first outlet pressure with the coolant of the inlet temperature and/or the inlet pressure to produce the coolant of a desired outlet pressure and temperature.

In various embodiments, the operations further include maintaining a temperature of the coolant within an operating constraint relative to a desired outlet temperature and/or pressure of the flow of coolant egressed from the CCA heat exchanger. In one embodiment, the operating constraint includes one or more of a maximum fuel temperature at the combustion section, a maximum lubricant temperature, or minimizing an amount of flow of bypass air.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a schematic cross-sectional view of an exemplary embodiment of a heat engine including a cooled cooling air (CCA) heat exchanger system;

FIGS. 2-9 are exemplary flow schematics depicting embodiments of the engine and heat exchanger of FIG. 1; and FIGS. 10-11 are a flowchart outlining exemplary steps of a method for operating an engine and heat exchanger system.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximations recited herein may include margins based on one more measurement devices as used in the art, such as, but not limited to, a percentage of a full scale measurement range of a measurement device or sensor. Alternatively, approximations recited herein may include margins of 10% of an upper limit value greater than the upper limit value or 10% of a lower limit value less than the lower limit value.

Embodiments of heat engines including cooled cooling air (CCA) heat exchanger systems and methods for operation are generally provided. The structures and methods shown and described herein may provide improved heat transfer to a cooled fluid for thermal attenuation at various components or systems of the heat engine. The CCA heat exchanger systems and methods provided herein provide a desired amount of heat transfer from a compressed air, such as between approximately 2% and approximately 50% less than an inlet temperature, while providing a pressure drop of the cooled compressed air of approximately 10% or less than the inlet pressure of the compressed air. Still further, the CCA heat exchanger systems and methods generally provided herein maintain the coolant within a desired temperature range, such as below a maximum coolant temperature based on an operating constraint. As such, the cooled cooling fluid defining the compressed air provides a desired outlet temperature and outlet pressure such as to provide cooling to one or more components within a secondary flowpath of a hot section of the engine (e.g., blades, vanes, casing, shrouds, within a combustion section 26, turbine or expansion section 31, or exhaust section 37 of the heat engine 10 described below).

Referring now to the drawings, FIG. 1 is a schematic partially cross-sectioned side view of an exemplary heat engine 10 (herein referred to as "engine 10") as may incorporate various embodiments of the present invention. Although further described herein as a turbofan engine, the engine 10 may define a steam turbine engine, or a turbomachine generally, including turbojet, turboprop, or turboshaft gas turbine engine configurations. As shown in FIG. 1, the engine 10 has a longitudinal or axial centerline axis 12 that extends therethrough for reference purposes. In general, the engine 10 may include a fan assembly 14 and a core engine 16 disposed downstream of the fan assembly 14.

The core engine 16 may generally include a substantially tubular outer casing 18 that defines an annular inlet 20 into a core flowpath 19 defined through the core engine 16. The outer casing 18 encases or at least partially forms, in serial flow relationship, a compressor section 21, such as having a booster or low pressure (LP) compressor 22 and a high pressure (HP) compressor 24; a combustion section 26; and an expansion section or turbine section 31, such as including a high pressure (HP) turbine 28 and a low pressure (LP) turbine 30. The turbine or expansion section 31 further includes a jet exhaust nozzle section 37 through which combustion gases 86 egress from the core engine 16. In various embodiments, the jet exhaust nozzle section 37 may further define an afterburner. The core engine 16 further defines a hot section 33 comprising the combustion section 26, the turbine or expansion section 31, and the jet exhaust nozzle section 37, through which combustion gases 86 are formed and flow. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 via a reduction gear 40 such as in an indirect-drive or geared-drive configuration.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. It should be appreciated by those of ordinary skill in the art that the nacelle 44 may be configured to be supported relative to the core engine 16 by a plurality of circumferentially-spaced outlet guide vanes or struts 46. Moreover, at least a portion of the nacelle 44 may extend over an outer portion of the outer casing 18 of the core engine 16 so as to define a fan bypass airflow passage 48 therebetween.

During operation of the engine 10, a volume of air as indicated schematically by arrows 74 enters the engine 10 through an associated inlet 76 of the fan case or nacelle 44 and/or fan assembly 14. As the air 74 passes across the fan blades 42 a portion of the air, as indicated schematically by arrows 78, is directed or routed into the bypass airflow passage 48 while another portion of the air as indicated schematically by arrow 80 is directed or routed into the core flowpath 19 of the core engine 16 at the LP compressor 22. Air 80 is progressively compressed as it flows through the core flowpath 19 across the LP and HP compressors 22, 24 towards the combustion section 26, such as shown schematically by arrows 81 depicting an increasing pressure and temperature of the flow of compressed air and arrows 82 depicting an exit temperature and pressure from the compressor section 21 (e.g., defining an inlet temperature and pressure to the combustion section 26). The now compressed air 82 flows into the combustion section 26 to mix with a liquid or gaseous fuel and burned to produce combustion gases 86. The combustion gases 86 generated in the combustion section 26 flow downstream through the core flowpath 19 into the HP turbine 28, thus causing the HP rotor shaft 34 to rotate, thereby supporting operation of the HP compressor 24. The combustion gases 86 are then routed through core flowpath 19 across the LP turbine 30, thus causing the LP rotor shaft 36 to rotate, thereby supporting operation of the LP compressor 22 and/or rotation of the fan shaft 38 and fan blades 42. The combustion gases 86 are then exhausted through the jet exhaust nozzle section 37 of the core engine 16 to provide propulsive thrust.

In the embodiment generally provided in FIG. 1, the engine 10 further defines a third stream bypass airflow passage 49. The third stream bypass airflow passage 49 is defined at least partially through the outer casing 18 from a compressor of the compressor section 21 (e.g., the LP compressor 22) to the fan bypass airflow passage 48. The third stream bypass airflow passage 49 selectively allows a flow of the compressed air 80, 81, shown schematically by arrows 79, from a compressor of the compressor section 21 (e.g., from the LP compressor 22) to mix with the portion of air 78 in the fan bypass airflow passage 48. The engine 10 enables the third stream bypass airflow passage 49 to completely or substantially close the flow of compressed air 79 from egressing to the fan bypass airflow passage 48 based on an operating condition of the engine 10 (e.g., high power conditions), such as to increase thrust output of the engine 10. The engine 10 further enables the third stream bypass airflow passage 49 to at least partially open the flow of compressed air 79 to egress to the fan bypass airflow passage 48 based on an operating condition of the engine 10 (e.g., low or mid power conditions), such as to reduce fuel consumption.

It should be appreciated that although the exemplary embodiment of the engine 10 generally provided in FIG. 1 is presented as a three-stream turbofan configuration, the engine 10 may define a two-stream (e.g., fan bypass airflow passage 48 and core flowpath 19) or one-stream heat engine configuration (e.g., core flowpath 19). It should further be appreciated that although the exemplary embodiment of the engine 10 generally provided in FIG. 1 is presented as a two-spool turbofan configuration, the engine 10 may define a third or more spool configuration in which the LP compressor 22 defines an intermediate pressure (IP) compressor coupled to an IP shaft and IP turbine, each disposed in serial flow relationship between a respective fan assembly 14, HP compressor 24, HP turbine 28, and LP turbine 30. Still further, the three-spool configuration may further couple the fan assembly 14 to the LP turbine 30 mechanically independent from the LP/IP compressor 22 and an IP turbine. Stated alternatively, the engine 10 may define three mechanically independent spools including respective combinations of a fan assembly and LP turbine, an IP compressor and IP turbine, and an HP compressor and HP turbine.

Referring still to FIG. 1, and further in conjunction with another exemplary schematic of the engine 10 provided in FIG. 2, the engine 10 further includes a cooled cooling air (CCA) heat exchanger system 100 (hereinafter, "CCA heat exchanger 100"). The schematic generally provided in FIG. 2 generally depicts embodiments of flows of fluid through embodiments of the engine 10 generally provided and described in regard to FIG. 1. Referring to FIG. 1, the CCA heat exchanger 100 may be defined at one or more of the fan bypass airflow passage 48, the third stream bypass airflow passage 49, within the outer casing 18, or within the combustion section 26. In various embodiments, the CCA heat exchanger 100 is defined at one or more of the outlet guide vanes or struts 46 of the fan assembly 14. For example, the CCA heat exchanger 100 may be disposed in the struts 46 or the outer casing 18 in thermal communication with one or more of the bypass airflow passages 48, 49. As another example, the CCA heat exchanger 100 may be coupled to or disposed within the fan casing or nacelle 44, the outer casing 18 of the core engine 16, or both. As yet another example, the CCA heat exchanger 100 may be disposed within the combustion section 26, such as in thermal communication with the core flowpath 19 or a secondary flowpath 27 (FIG. 2) within the combustion section 26.

Referring to FIG. 2, the CCA heat exchanger 100 receives a portion of the flow of compressed air 81, 82 provided from the core flowpath 19 at the compressor section 21, shown schematically by arrows 99 entering the CCA heat exchanger 100. In various embodiments, the compressed air 99 may be a portion of the compressed air 81 mid-stage within the compressor section 21. For example, the compressed air 81 is defined between an inlet and an exit of the compressor section 21 such as to define a temperature and/or pressure of the compressed air 81, and subsequently the compressed air 99, less than a maximum temperature/pressure of the compressed air 82 entering the combustion section 26. Alternatively, the compressed air 99 entering the CCA heat exchanger 100 may be a portion of the compressed air 82 entering the combustion section 26 (e.g., compressor discharge air, Station 3.0), such as to define a temperature/pressure greater than the compressed air 81 from mid-stage of the compressor section 21. In still various examples, such as further described below, the engine 10 may modulate or alternate from which flow of compressed air 81, 82 the compressed air 99 is extracted to enter the CCA heat exchanger 100. The compressed air 99 entering the CCA heat exchanger 100 defines an inlet temperature and an inlet pressure. The inlet temperature and the inlet pressure of the compressed air 99 entering the CCA heat exchanger 100 is substantially equal to the temperature and pressure at the core flowpath 19 of the compressor section 21 from which the compressed air 99 was pulled from the flow of compressed air 81, 82.

It should be appreciated that as the portion of compressed air 99 egresses from the core flowpath 19 to the CCA heat exchanger 100, losses in temperature and pressure generally ensue based at least on a length, area, or volume, or leakages along a flowpath between the compressor section 21 and the CCA heat exchanger 100. As such, references to the inlet temperature and the inlet pressure described herein may generally refer to a maximum temperature and a maximum pressure of the compressed air 99 pulled from the core flowpath 19. Alternatively, the inlet temperature and the inlet pressure of the compressed air 99 may be considered generally equal to the temperature and pressure of the compressed air 81, 82 at a station or stage along the compressor section 21 from which the compressed air 99 was drawn to the CCA heat exchanger 100.

The engine 10 further includes a coolant supply system 110 providing a flow of coolant 109 to the CCA heat exchanger 100. The coolant 109 is provided in thermal communication with the compressed air 99 at the CCA heat exchanger 100. The coolant 109 entering the CCA heat exchanger 100 extracts or transfers thermal energy from the compressed air 99 such as to cool it to an outlet temperature defined at compressed air 101 discharged from the CCA heat exchanger 100 to the hot section 33 of the engine 10.

In various embodiments, the outlet temperature of the compressed air 101 discharged from the CCA heat exchanger 100 to the hot section 33 is between approximately 90% and approximately 50% of the inlet temperature of the compressed air 99 upstream of the CCA heat exchanger 100. In one embodiment, the outlet temperature of the compressed air 101 at the hot section 33 is between approximately 80% and approximately 50% (inclusively) of the inlet temperature of the compressed air 99. In still various embodiments, the compressed air 101 more specifically defines the outlet temperature at the secondary flowpath 27 at the combustion section 26, such as shown schematically by the flow of compressed air 102 at the combustion section 26. In still another embodiment, the compressed air 101 more specifically defines the outlet temperature at the secondary flowpath 32 at the expansion section 31, including exhaust section 37 (shown in FIG. 1), such as shown schematically by the flow of compressed air 103, 104. Still further, the flow of compressed air 103 defines a higher pressure upstream of the compressed air 104 relative to the core flowpath 19 at the expansion section 31. For example, referring to FIGS. 1 and 2, the compressed air 103 may define entry into the secondary flowpath 32 at a blade, vane, frame, or casing of the high pressure turbine 28. As another example, the compressed air 104 may define entry into the secondary flowpath 32 at a blade, vane, frame, or casing of the low pressure turbine 30 or the exhaust section 37, or between the high pressure turbine 28 and the low pressure turbine 30 (e.g., a mid-turbine frame or inter-turbine frame).

The CCA heat exchanger 100 further includes a CCA circuit 105 defining a walled conduit or manifold providing the compressed air 99, 101 from the core flowpath 19 at the compressor section 21, the combustion section 26, or both, to the CCA heat exchanger 100. The CCA circuit 105 further defines the walled conduit or manifold from the CCA heat exchanger 100 to the hot section 33 of the engine 10. In various embodiments, the CCA circuit 105 is defined more specifically to the secondary flowpath 27 at the combustion section 26, the secondary flowpath 32 at the expansion section 31, or both. As such, in one embodiment, the CCA circuit 105 provides the compressed air 99 to the CCA heat exchanger 100 from a portion of the mid-stage flow of compressed air 81 at the compressor section 21, shown schematically at 91. In another embodiment, the CCA circuit 105 provides the compressed air 99 to the CCA heat exchanger 100 from a portion of the flow of compressed air 82 as the compressor discharge air downstream of the compressor section 21 (e.g., at the combustion section 26 upstream of a combustion chamber), shown schematically at 92.

The CCA heat exchanger 100, including the CCA circuit 105, defines the walled conduits, manifolds, and openings (e.g., cross sectional areas) such as to minimize a pressure loss via an increased diameter or cross sectional area. Passages within the CCA heat exchanger 100 are sized to minimize pressure loss while further defining flow rates of the compressed air 99, 101 therethrough to provide the desired change in temperature from the inlet temperature at compressed air 99 to the outlet temperature at compressed air 101.

The CCA heat exchanger 100 defines a pressure loss or pressure drop, defined by:

$$\text{pressure loss} = \frac{P1 - P2}{P1}$$

The pressure loss or pressure drop is defined at least by a difference of a first pressure P1 upstream of the CCA heat exchanger 100 (e.g., at compressed air 99) and a second pressure P2 downstream of the CCA heat exchanger 100 (e.g., at compressed air 101), together divided by the first pressure P1.

In various embodiments, the CCA heat exchanger 100 defines a pressure loss of approximately 10% or less between the upstream inlet pressure of compressed air 99 at the compressor section 21 and the downstream outlet pressure of compressed air 101 at the hot section 33. In one embodiment, the CCA heat exchanger 100 provides the egressed compressed air 101 to the hot section 33 (e.g., at the secondary flowpath 27, 32, or into the core flowpath 19) defining an outlet pressure or P2 approximately 90% or greater than the inlet pressure or P1 of the inlet compressed air 99 into the CCA heat exchanger 100. In another embodiment, the outlet pressure or P2 at the secondary flowpath 27, 32 is approximately 105% or greater than a pressure of combustion gases 86 at the core flowpath 19 at the expansion section 31. As such, the CCA heat exchanger 100 provides the flow of compressed air 101 at a pressure sufficient to ensure a desired flow direction (i.e., from the secondary flowpath 27, 32 into the core flowpath 19 at the hot section 33).

In various embodiments, the coolant 109, 111 defines a liquid or gaseous fuel, compressed air, refrigerant, liquid metal, inert gas, a supercritical fluid, compressed air, or combinations thereof. Various embodiments of the coolant 109, 111 defining a supercritical fluid may include, but is not limited to, carbon dioxide, water, methane, ethane, propane, ethylene, propylene, methanol, ethanol, acetone, or nitrous oxide, or combinations thereof.

In still various embodiments, the coolant 109, 111 defining a refrigerant may include, but is not limited to, halon, perchloroolefin, perchlorocarbon, perfluoroolefin, perfluorocarbon, hydroolefin, hydrocarbon, hydrochloroolefin, hydrochlorocarbon, hydrofluoroolefin, hydrofluorocarbon, hydrochloroolefin, hydrochlorofluorocarbon, chlorofluoroolefin, or chlorofluorocarbon type refrigerants, or combinations thereof.

Still further various embodiments of coolant 109, 111 defining a refrigerant may include methylamine, ethylamine, hydrogen, helium, ammonia, water, neon, nitrogen, air, oxygen, argon, sulfur dioxide, carbon dioxide, nitrous oxide, or krypton, or combinations thereof.

In still yet various embodiments, the fuel, including the coolant 109, 111 defining a liquid or gaseous fuel, may include, but is not limited to, gasoline or petrol, propane, ethane, hydrogen, diesel, kerosene or one or more jet fuel formulations (e.g., Jet A, JP1, etc.), coke oven gas, natural gas, or synthesis gas, or combinations thereof.

In still various embodiments, the coolant 109, 111 defining air may include the flow of bypass air 78, 79 from the fan assembly 14 or compressor section 21 bypassing the combustion section 26, such as described in regard to FIG. 1 and the flows through the fan bypass airflow passage 48 and/or the third stream bypass airflow passage 49.

Referring now to 3-6, flow schematics are provided depicting at least a portion of the engine 10 generally shown and described in regard to FIGS. 1-2. Furthermore, the embodiments provided in 3-6 generally depict elements or details within the CCA heat exchanger 100 generally provided in FIGS. 1-2.

Referring now to FIG. 3, the CCA heat exchanger 100 may include one or more heat exchanger elements 200 through which the flow of coolant 109 enters in thermal communication with the flow of compressed air 99. The CCA heat exchanger 100 may include a plurality of the heat exchanger elements 200 in substantially serial flow arrangement with one another relative to the flow of compressed air 99 from the compressor section 21 to the hot section 33. The CCA heat exchanger 100 may further include one or more valves 210 disposed between the plurality of heat exchanger elements 200. In various embodiments, the valve 210 defines a bypass valve such as to bypass at least a portion of the flow of compressed air 99 from one or more other heat exchanger elements 200 to discharge or egress to the hot section 33 as one or more flows of compressed air 102, 103, 104 defining different outlet temperatures and outlet pressures from one another.

For example, as the flow of compressed air 99 enters and egresses each heat exchanger element 200, the flow defines a different outlet temperature and different outlet pressure relative to one another, such as shown schematically by arrows 101(a), 101(b), 101(c). For example, the flow of compressed air 101(a) egressing a first of a serial arrangement of heat exchanger elements 200 generally defines an outlet temperature and outlet pressure within the ranges described above. A portion of the flow of compressed air 101(a) egressing the first heat exchanger element 200 is directed via the valve 210 to the hot section 33. For example, the valve 210 diverts a portion of the compressed air 101(a), shown schematically by arrows 104, to the hot section 33. As the first flow of compressed air 101(a) generally defines a lesser temperature change and lesser pressure drop than subsequent serial flows of compressed air 101(b), 101(c), a portion of the flow of compressed air 101(a) may be directed to the hot section 33 as flow of compressed air 104.

As another example, the flow of compressed air 101(b) egressing a second of a serial arrangement of heat exchanger elements 200 generally defines an outlet temperature and outlet pressure within the ranges described above and less than the portion of the flow of oxidizer 101(a). A second of the valve 210 further directs at least a portion of the flow of oxidizer 101(b) to the hot section 33, such as via flow of compressed air 102.

As still another example, the flow of compressed air 101(c) egressing a third of a serial arrangement of heat exchanger elements 200 generally defines an outlet temperature and outlet pressure within the ranges described above and less than the portion of the flow of oxidizer 101(b). A third of the valve 210 further directs at least a portion of the flow of oxidizer 101(c) to the hot section 33, such as via flow of compressed air 103.

Referring now to the exemplary embodiment generally provided in FIG. 4, the valve 210 defines a bypass valve such as to bypass at least a portion of the flow of compressed air 99, shown schematically by arrows 99(a), from one or more other heat exchanger elements 200. The bypassed flows of compressed air 99(a) defining various outlet temperatures and outlet pressures are then recombined with the flow of compressed air 99 flowed through the plurality of heat exchanger elements, shown schematically by arrows 99(b), to output from the CCA heat exchanger 100 to the hot section 33 the flow of compressed air 101 defining the outlet temperature and outlet pressure such as defined above.

In one embodiment, the CCA heat exchanger 100 further comprises a mixer 220 to which each flow of compressed air 99(a), 99(b) is provided and recombined to produce the output compressed air 101. The mixer 220 combines one or more flows of the compressed air 99 from the heat exchanger element(s) 200 such as to normalize or average a pressure and/or temperature of the one or more flows of compressed air 99 to produce or egress the flow outlet compressed air 101. For example, referring to FIG. 4, the mixer 220 receives the bypass flow of compressed air 99(a) and another flow of compressed air processed through additional heat exchanger elements 200, shown schematically by arrows 99(b). The bypass flow of compressed air 99(a) may generally define a different temperature and/or pressure in contrast to the flow of compressed air 99(b) processed through additional heat exchanger elements 200. The mixer 220 receives and mixes the flows of compressed air 99(a), 99(b) and egresses the outlet flow of compressed air 101 defining the desired outlet temperature and outlet pressure. In still other embodiments, the mixer 220 may further, or alternatively, receive and mix a portion of the flow of compressed air 82 egressed from the compressor section 21 with one or more flows of compressed air 99(a), 99(b), 101 processed through one or more heat exchanger elements 200.

In various embodiments such as generally provided in regard to FIGS. 1-4, the coolant supply system 110 defines a fluid system providing the flow of coolant 109 to the CCA heat exchanger 100, or more particularly, one or more of the heat exchanger elements 200 at the CCA heat exchanger 100. The coolant supply system 110 may define a fluid system such as one or more of a fuel system, a lubricant system, a hydraulic fluid system, a refrigerant system, one or more compressor bleeds, or another system providing the flow of coolant 109, 111. In other embodiments, the coolant supply system 110 extracts or provides a flow of air as the coolant 109, 111 from one or more of the bypass airflow passages 48, 49. In still other embodiments, the coolant supply system 110 extracts or provides a flow of air as the coolant 109, 111 from one or more compressor bleeds or stages along the compressor section 21. In still various embodiments, a plurality of the coolant supply system 110 each define one or more embodiments of the fluid system, such as generally described above.

Referring to the embodiments generally provided in regard to FIGS. 3-4, each coolant supply system 110 provides the flow of coolant 109 to each heat exchanger element 200. As such, each combination of the coolant supply system 110 and the heat exchanger element 200 may define a different heat transfer rate, change in temperature between the compressed air 99 and the coolant 109, and different pressure drop.

Referring now to FIG. 5, another exemplary flow schematic is provided of the engine 10 including the CCA heat exchanger 100 generally shown and described in regard to FIGS. 1-4. However, in FIG. 5, the plurality of heat exchanger elements 200 are disposed in parallel flow arrangement relative to one another between the compressor section 21 and the expansion section 31. Similarly as described in regard to FIG. 4, the parallel arrangement of heat exchanger elements 200 may be selectively operated to produce the desired change in temperature and pressure drop between the inlet temperature/pressure of the compressed air 99 and the outlet temperature/pressure of the compressed air 101. Still further, the parallel arrangement of heat exchanger elements 200 reduces inlet compressed air flow 99 such as to reduce an associated pressure loss while increasing heat transfer to the coolant 109, 111.

Referring to FIGS. 3-5, the arrangement of heat exchanger elements 200 may further enable maintaining or adjusting a temperature/pressure of each of the flows of coolant 109, 111 at each heat exchanger element 200. For example, each flow of coolant 109 from each coolant supply system 110 may each define an operating constraint relative to a desired outlet or discharge temperature/pressure of the flow of coolant 111 egressed from CCA heat exchanger 100, or each heat exchanger element 200 thereof. Such operating constraints may include a maximum fuel temperature at a combustor fuel manifold at the combustion section 26 (e.g., based on a health, safety, operability, or usability parameter of the fuel); a maximum coolant temperature wherein the egressing flow of coolant 111 is further utilized for one or more other systems (e.g., an environmental control system (ECS), one or more computers, electronics, electric machines, generators/motors, bearing assemblies, hydraulic systems, clearance control systems, etc.); a maximum lubricant temperature (e.g., based on a bearing assembly or vibrational response of the engine 10); or minimizing adverse effects to the aerodynamic cycle of the engine 10 by minimizing utilization or an amount of the flows of bypass air 78, 79.

Referring now to FIG. 6, yet another exemplary schematic flowchart is provided of the engine 10 including the CCA heat exchanger 100 generally shown and described in regard to FIGS. 1-5. In the embodiment generally provided in FIG. 5, the coolant supply system 110 provides the flow of coolant 109 in serial flow to the plurality of heat exchanger elements 200. More specifically, a first heat exchanger element 200(*a*) receives the flow of compressed air 99 defining the inlet temperature and inlet pressure from the compressor section 21. The coolant 109 at the first heat exchanger element 200 removes thermal energy from the compressed air 99 to produce the flow of compressed air 101 defining the outlet temperature and outlet pressure egressed to the expansion section 31. A second coolant supply system 110(*a*) provides another flow of coolant 109(*a*) to a second heat exchange element 200(*b*). The second heat exchanger element 200(*b*) receives an outlet flow of coolant 109(*c*) from the first heat exchanger element 200(*a*) defining a generally higher temperature than the inlet flow of coolant 109 into the first heat exchanger element 200(*a*). The flow of coolant 109(*c*) enters the second heat exchanger element 200(*b*) in thermal communication with the flow of coolant 109(*a*). In various embodiments, at least a portion of the flow of coolant 109(*a*) may bypass the second heat exchanger element 200(*b*) via the valve 210, such as depicted at arrows 109(*b*). In still various embodiments, the bypassed flow 109(*b*) may mix at the mixer 220 with an outlet flow from the second heat exchanger element 200(*b*), shown schematically at 109(*d*). The mixer 220 produces a temperature/pressure normalized flow of coolant 111(*a*) flowed to the combustion section 26. In various embodiments, the flow of coolant 111(*a*) may define compressed air providing cooling to the combustion section 26. In other embodiments, the coolant 111(*a*) defines a fuel utilized for producing combustion gases 86.

Referring generally to the embodiments provided in 3-6, the coolant supply system 110 may define a partially or substantially closed loop circuit. For example, the coolant 109 may flow in thermal communication through one or more heat exchanger elements 200 and return (as coolant 111) to the coolant supply system 110. As another example, the coolant 109, 111 may further flow in thermal communication with one or more other systems, such as a bearing assembly, ECS, gear assemblies, dampers, electric machines, electronics, computers, or hydraulic systems, or a heat sink generally, before returning to the coolant supply system 110.

Referring now to FIG. 7-8, further exemplary flow schematics are provided of the engine 10 including the CCA heat exchanger 100 generally shown and described in regard to FIGS. 1-5. Referring to FIG. 7-8, the engine 10 may further include a boost compressor 21(*a*) in serial flow arrangement between the compressor section 21 and the CCA heat exchanger 100. The boost compressor 21(*a*) increases the inlet pressure of the compressed air 99 into the CCA heat exchanger 100, shown schematically by arrows 99(*c*). As such, the CCA heat exchanger 100 may define a higher pressure loss relative to the increased pressure of the compressed air 99(*c*) from the boost compressor 21(*a*) such as to define the compressed air 101 of the outlet temperature and outlet pressure such as described above, such as greater than the pressure of the combustion gases 86

Referring now to FIG. 9, another exemplary flow schematic is provided of the engine 10 including the CCA heat exchanger 100 generally shown and described in regard to FIGS. 1-7. In the embodiment generally provided, the coolant 109, 111 flows through a plurality of the CCA heat exchanger system 100 and the coolant supply system 110 in a substantially closed loop arrangement. The plurality of CCA heat exchanger systems 100 and the coolant supply system 110 are disposed in serial flow arrangement relative to the flow of coolant 109, 111 therethrough.

Referring still to FIG. 9, the flow of compressed air 91 from the mid-stage flow of compressed air 81 in the compressor section 21 is extracted and provided to the CCA heat exchanger 100. The flow of compressed air 91 is provided in thermal communication with the outlet flow of coolant 111 from the upstream CCA heat exchanger 100. The resultant cooled flow of compressed air 104 is provided to the secondary flowpath 32 at the expansion section 31. More specifically, the flow of compressed air 104 is provided relatively downstream in the secondary flowpath 32, such as to the LP turbine 30 (FIG. 1) in contrast to the HP turbine 28.

Another flow of compressed air 92 from downstream of the compressor section 21 is extracted and provided to another CCA heat exchanger 100. The flow of coolant 109 is provided to the CCA heat exchanger 100 in thermal communication with the flow of compressed air 92 to produce the flow of compressed air 102, 103 defining the desired outlet temperature and outlet pressure. As previously described, the flow of compressed air 92 defines a temperature and pressure greater than the flow of compressed air 91 extracted further upstream in the compressor section 21. As such, the compressed air 92 is provided to a more upstream CCA heat exchanger 100 such that the coolant 109 defines a cooler temperature or generally greater heat transfer potential relative to the coolant 111 egressed from the CCA heat exchanger 100 and provided to another CCA heat exchanger 100.

Alternatively, the flow of compressed air 91 defines a temperature and pressure less than the flow of compressed air 92 extracted further downstream in the compressor section 21. As such, the compressed air 91 is provided to a more downstream CCA heat exchanger 100 such that the coolant 111 defines a warmer temperature or generally lesser heat transfer potential relative to the coolant 109 provided to the upstream CCA heat exchanger 100.

Referring now to FIGS. 10-11, a flowchart outlining exemplary steps of a method for operating a heat exchanger system for a heat engine is generally provided (hereinafter, "method 1000"). The method 1000 may be utilized or implemented in various embodiments of the engine 10 generally shown and described in regard to FIGS. 1-9. Although the method 1000 is described below in reference to the embodiments of the engine 10 and CCA heat exchanger 100 shown and described in regard to FIGS. 1-9, it should be appreciated that the method 1000 may further be utilized or implemented in other engine and heat exchanger systems. Still further, although the method 1000 is presented below in a particular sequence, it should be appreciated that the method 1000 may be re-ordered, re-sequenced, or steps removed, omitted, or rearranged without deviating from the scope of the disclosure.

Still yet further, the method 1000 may be executed via a controller 211 at the engine 10 (FIG. 1) such as to selectively flow, adjust, modulate, or alter one or more flows of the compressed air 91, 92, 99, 101, 102, 103, 104 or the coolant 109, 111, the valve 210, or the coolant supply system 110. Various embodiments of the controller 211 are configured to store and execute instructions to perform operations, such as one or more of the steps of embodiments of the method 1000 provided herein. The controller 211 is further configured to communicate, command, receive, or store instructions or data for operating the engine 10 including the CCA heat exchanger 100. In general, the controller 211 can correspond to any suitable processor-based device, including one or more computing devices. For instance, FIG. 1 illustrates one embodiment of suitable components that can be included within the controller 211.

As shown in FIG. 1, the controller 211 can include a processor 212 and associated memory 214 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof. In various embodiments, the controller 211 may define one or more of a full authority digital engine controller (FADEC), a propeller control unit (PCU), an engine control unit (ECU), or an electronic engine control (EEC).

As shown, the controller 211 may include control logic 216 stored in memory 214. The control logic 216 may include instructions that when executed by the one or more processors 212 cause the one or more processors 212 to perform operations such as those outlined in the method 1000 and embodiments thereof. As such, the instructions may include one or more steps of the method 1000. Still further, the operations may include executing one or more steps of the method 1000. In various embodiments, the memory 214 may further include one or tables, charts, functions, or graphs storing data that may correspond a compressed air or coolant temperature or pressure to a desired function of the CCA heat exchanger 100 such as to produce the desired outlet temperature and pressure of the compressed air 101.

Additionally, as shown in FIG. 1, the controller 211 may also include a communications interface module 230. In various embodiments, the communications interface module 230 can include associated electronic circuitry that is used to send and receive data. As such, the communications interface module 230 of the controller 211 can be used to receive data from the CCA heat exchanger 100, the coolant supply system 110, the compressor section 21, the combustion section 26, or the turbine section 31, or the bypass airflow passages 48, 49. The data may include, but is not limited to, vibration data, surface temperature, fluid temperature, pressure, and/or flow rate, or rotational speed or acceleration. In addition, the communications interface module 230 can also be used to communicate with any other suitable components of the engine 10, including any number of sensors configured to monitor one or more operating parameters of the engine 10, such as, but not limited to, a parameter of compressed air or coolant (e.g., a flow, pressure, volume, area, or other geometry, or density of fluid, etc. utilized to calculate the flow of fluid). It should be appreciated that the communications interface module 230 can be any combination of suitable wired and/or wireless communications interfaces and, thus, can be communicatively coupled to one or more components of the engine 10 via a wired and/or wireless connection.

The method 1000 includes at 1010 flowing the compressed air 99 defining an inlet temperature and an inlet pressure from the core flowpath 19 to the CCA heat exchanger 100 in thermal communication with the coolant 109 from the coolant supply system 110; and at 1020 flowing the compressed air 101 from the CCA heat exchanger 100 to a hot section 33 (e.g., at secondary flowpath 27, 32) in which the compressed air 101 defines an outlet temperature between approximately 2% and approximately 50% (inclusively) less than the inlet temperature of the compressed air 99 and an outlet pressure at the hot section 33 (e.g., at the secondary flowpath 27, 32) approximately 90% or greater than the inlet pressure of the compressed air 99.

In various embodiments, the method 1000 at 1020 further includes defining an outlet temperature between approximately 10% and approximately 50% (inclusively) less than the inlet temperature of the compressed air 99 at the hot section 33. In still various embodiments, the method 1000 at 1020 further includes defining an outlet temperature between approximately 20% and approximately 50% (inclusively) less than the inlet temperature of the compressed air 99 at the hot section 33.

In various embodiments, flowing the compressed air 99 includes generating the flow of compressed air 81, 82 through the engine 10. In one embodiment, the method 1000 further includes at 1022 generating the flow of compressed air 81, 82 defined at a high power condition (e.g., takeoff power, or between 90% and 105%, inclusively, of a maximum rotational speed of one or more spools of the engine); and at 1024 extracting at least a portion of the flow of compressed air 81, 82 from the compressor section 21 to the CCA circuit 105. Generating the flow of compressed air 81, 82 at the high power condition further include at 1026 operating the CCA heat exchanger 100 to generate a maximum temperature increase at the coolant 109 defining a fuel. Generating the flow of compressed air at the high power condition may further include operating the CCA heat exchanger 100 to generate a maximum temperature increase at the coolant 109 defining one or more of bypass air 78, 79, a refrigerant, a supercritical fluid, liquid metal, fuel, inert gas, or compressed air, or combinations thereof.

In another embodiment, generating the flow of compressed air 81, 82 further includes at 1023 generating the flow of compressed air 81, 82 at the compressor section 21 at a low or mid power condition (e.g., ignition, ground idle, flight idle, cruise, or approach conditions, or between 20% and up to 90% of a maximum rotational speed of one or more spools of the engine). Generating the flow of compressed air at the low or mid power condition further includes operating the CCA heat exchanger 100 to generate a maximum temperature increase at the coolant defining a fuel, a refrigerant, a supercritical fluid, liquid metal, or inert gas. Generating the flow of compressed air and providing to the CCA heat exchanger 100 may further include at 1025 discontinuing flow of the coolant 109 defining one or more of the bypass airflow 78, 79 while the engine 10 defines one or more low or mid power conditions.

The method 1000 may further include at 1030 modulating a valve 210 at the CCA heat exchanger 100 to define a different temperature and a different pressure of the flow of compressed air 101. The method 1000 may further include at 1040 adjusting one or more of the inlet temperature and the inlet pressure of the compressed air 101 via adjusting from where in the compressor section 21 the compressed air 99 from the core flowpath 19 is provided to the CCA heat exchanger 100. For example, adjusting from where in the compressor section 21 the compressed air 99 is derived from the core flowpath 19 includes adjusting or modulating the compressed air 99 entering the CCA heat exchanger 100 from compressed air 91 to compressed air 92. In still various embodiments, adjusting or modulating the flow of compressed air 99 may include adjusting from where along the compressor section 21 the flow of compressed air 91 is derived from flow 81 in the core flowpath 19. As yet another example, the method 1000 at 1040 may include mixing flows of the compressed air 91, 92 from the core flowpath 19.

The method 1000 may still further include at 1050 determining a desired outlet temperature, outlet pressure, or both, of the compressed air 101 based at least on an operating condition of the engine 10. In various embodiments, the operating condition of the engine 10 is based at least on a pressure, a temperature, a flow rate, or combinations thereof of the compressed air 81, 82 at the core flowpath 19.

The method 1000 may further include at 1060 modulating one or more valves 210 at the CCA heat exchanger 100 to mix the coolant 109(a) of a first outlet temperature and/or first outlet pressure with the coolant 109(d) of the inlet temperature and/or the inlet pressure to produce the coolant 111(a) of a desired outlet pressure and temperature, such as shown and described in regard to FIG. 6.

The method 1000 may further include at 1070 maintaining a temperature of the coolant 109 within an operating constraint relative to a desired outlet temperature and/or pressure of the flow of coolant 111 egressed from the CCA heat exchanger 100, such as described above in regard to FIGS. 1-9. For example, in various embodiments, the operating constraint includes one or more of a maximum fuel temperature at the combustion section, a maximum lubricant temperature, or minimizing an amount of flow of bypass air.

All or part of the CCA heat exchanger 100 may be part of a single, unitary component and may be manufactured from any number of processes commonly known by one skilled in the art. Furthermore, the CCA heat exchanger 100 may be constructed as a single, unitary component, or a plurality of components, via any number of manufacturing processes referred to as "additive manufacturing" or "3D printing". Additionally, any number of casting, machining, welding, brazing, or sintering processes, or any combination thereof may be utilized to construct the CCA heat exchanger 100. Furthermore, the CCA heat exchanger 100 may constitute one or more individual components that are mechanically joined (e.g. by use of bolts, nuts, rivets, or screws, or welding or brazing processes, or combinations thereof) or are positioned in space to achieve a substantially similar geometric, aerodynamic, or thermodynamic results as if manufactured or assembled as one or more components. Non-limiting examples of suitable materials include high-strength steels or nickel and cobalt-based alloys, or combinations thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A heat engine, the heat engine comprising:
a core engine comprising a compressor section configured to generate a flow of a compressed air from a core flowpath of the heat engine and a hot section defining a secondary flowpath;
a cooled cooling air (CCA) heat exchanger system disposed in serial flow arrangement between the compressor section and the hot section, wherein the compressor section, the CCA heat exchanger system, and the secondary flowpath of the hot section together define a CCA circuit; wherein the CCA heat exchanger system comprises:
a plurality of heat exchanger elements through which a coolant flows in thermal communication with the compressed air from the compressor section, wherein each of the plurality of heat exchanger elements are disposed in serial flow arrangement relative to one another;
one or more valves disposed between each of the plurality of heat exchanger elements; and
wherein each of the one or more valves defines a bypass valve configured to bypass at least a portion of the flow of the compressed air from the plurality of heat exchanger elements to discharge the portion of the flow of the compressed air to the hot section as a plurality of flows of compressed air;
a coolant supply system configured to provide a flow of a coolant to the CCA heat exchanger system; and
a controller comprising a processor and memory configured to store instructions that when executed by the processor causes the processor to perform operations, the operations comprising:
flowing the compressed air defining an inlet temperature and an inlet pressure from the compressor section through the CCA circuit in thermal communication with the coolant from the coolant supply system; and
flowing from the CCA heat exchanger system to the secondary flowpath the compressed air defining at the hot section an outlet temperature between 25% and 50% less than the inlet temperature, and further defining at the secondary flowpath an outlet pressure 90% or greater than the inlet pressure.

2. The heat engine of claim 1, wherein the operations further comprise:
generating the flow of the compressed air at the compressor section at a high power condition of the heat engine; and
extracting at least a portion of the flow of the compressed air from the compressor section to the CCA circuit.

3. The heat engine of claim 2, wherein the operations further comprise:
operating the CCA heat exchanger system to generate a maximum temperature increase at the coolant defining one or more of bypass air, refrigerant, supercritical fluid, liquid metal, fuel, or inert gas.

4. The heat engine of claim 1, wherein the operations further comprise:
generating the flow of the compressed air at the compressor section at a low or mid power condition of the heat engine;
extracting at least a portion of the flow of the compressed air from the compressor section to the CCA circuit; and
discontinuing the flow of the coolant defining one or more of a bypass airflow when the heat engine defines the low or mid power condition.

5. The heat engine of claim 1, wherein the operations further comprise:
modulating a valve at the CCA heat exchanger system to define a different temperature and a different pressure of the flow of the compressed air.

6. The heat engine of claim 5, wherein the operations further comprise:
adjusting one or more of the inlet temperature and the inlet pressure of the compressed air via adjusting from where in the compressor section the compressed air from the core flowpath is provided to the CCA heat exchanger system.

7. The heat engine of claim 5, wherein the operations further comprise:
adjusting one or more of the inlet temperature and the inlet pressure of the compressed air via mixing flows of the compressed air from the core flowpath.

8. The heat engine of claim 2, wherein the operations further comprise:
modulating one or more valves at the CCA heat exchanger system to mix the coolant of a first outlet temperature and/or first outlet pressure with the coolant of the inlet temperature and/or the inlet pressure to produce the coolant of a desired outlet pressure and temperature.

9. The heat engine of claim 2, wherein the operations further comprise:
maintaining a temperature of the coolant within an operating constraint relative to a desired outlet temperature and/or pressure of the flow of the coolant egressed from the CCA heat exchanger system,
wherein the operating constraint includes one or more of a maximum fuel temperature at a combustion section, a maximum lubricant temperature, or minimizing an amount of flow of bypass air.

10. A heat engine, the heat engine comprising:
a compressor section providing a flow of a compressed air from a core flowpath of the heat engine;
a cooled cooling air (CCA) heat exchanger system to which the flow of the compressed air is provided from the compressor section;
a coolant supply system providing a flow of a coolant to the CCA heat exchanger system in thermal communication with the flow of the compressed air at the CCA heat exchanger system, wherein the coolant supply system and CCA heat exchanger system together define a CCA circuit through which the compressed air flows in thermal communication with the coolant; and
a hot section disposed downstream of the compressor section along the core flowpath through which combustion gases flow,
wherein the hot section defines a secondary flowpath through which the flow of the compressed air from the CCA heat exchanger system is provided,
wherein the flow of the compressed air defines an inlet temperature and an inlet pressure from the core flowpath at the compressor section,
wherein the flow of the compressed air defines an outlet temperature at the secondary flowpath at the hot section between 25% and 50% less than the inlet temperature, and
wherein the flow of the compressed air defines an outlet pressure at the secondary flowpath greater than 90% of the inlet pressure of the flow of the compressed air at the core flowpath at the compressor section,
wherein the CCA heat exchanger system comprises:
a plurality of heat exchanger elements through which the coolant flows in thermal communication with the compressed air from the compressor section, wherein each of the plurality of heat exchanger elements are disposed in serial flow arrangement relative to one another;

wherein the CCA heat exchanger system further comprises one or more valves disposed between each of the plurality of heat exchanger elements; and wherein each of the one or more valves defines a bypass valve configured to bypass at least a portion of the flow of the compressed air from the plurality of heat exchanger elements to discharge the portion of the flow of the compressed air to the hot section as a plurality of flows of compressed air.

11. The heat engine of claim 10, wherein the plurality of flows of compressed air each define different outlet temperatures and outlet pressures from one another.

12. The heat engine of claim 10, wherein the one or more valves selectively bypasses at least a portion of the flow of the compressed air from one or more heat exchanger elements.

13. The heat engine of claim 10, wherein the CCA heat exchanger system further comprises a mixer, wherein each of the one or more valves defines a bypass valve configured to bypass at least a portion of the flow of the compressed air from the plurality of heat exchanger elements to discharge portions of the flow of the compressed air from the plurality of heat exchanger elements to the mixer, wherein the mixer is configured to combine the portions of the flow of the compressed air and discharge the combined portions to the hot section.

14. The heat engine of claim 10, wherein the coolant supply system defines one or more of a fuel system, a lubricant system, a hydraulic fluid system, a refrigerant system, a bypass airflow passage, a compressor bleed, or combinations thereof, and wherein the coolant is a liquid or gaseous fuel, refrigerant, supercritical gas, a liquid metal, inert gas, bypass airflow, the compressed air, or combinations thereof.

\* \* \* \* \*